(12) United States Patent
Bisgrove et al.

(10) Patent No.: US 9,529,739 B2
(45) Date of Patent: Dec. 27, 2016

(54) COMMUNICATIONS INTERFACE BETWEEN TWO NON-COMPLIMENTARY COMMUNICATION DEVICES

(71) Applicant: PAR Technology Corporation, New Hartford, NY (US)

(72) Inventors: Shawn Bisgrove, Rome, NY (US); Edward Bohling, Clinton, NY (US)

(73) Assignee: PAR Technology Corporation, New Hartford, NY (US)

( * ) Notice: Subject to any disclaimer, the term of this patent is extended or adjusted under 35 U.S.C. 154(b) by 0 days.

(21) Appl. No.: 13/947,830

(22) Filed: Jul. 22, 2013

(65) Prior Publication Data

US 2014/0025848 A1    Jan. 23, 2014

Related U.S. Application Data

(60) Provisional application No. 61/673,945, filed on Jul. 20, 2012.

(51) Int. Cl.
*G06F 13/28* (2006.01)
*G06F 13/10* (2006.01)
(Continued)

(52) U.S. Cl.
CPC .......... *G06F 13/10* (2013.01); *G06F 13/4045* (2013.01); *G06F 13/28* (2013.01); *H04L 29/06* (2013.01); *H04L 29/08072* (2013.01)

(58) Field of Classification Search
None
See application file for complete search history.

(56) References Cited

U.S. PATENT DOCUMENTS 7,783,070 B2 *   8/2010  Fadell ................. G06F 1/1632
                                          381/123
2005/0241026 A1 * 10/2005  Esler et al. ................. D24/100
(Continued)

FOREIGN PATENT DOCUMENTS

KR     10-2007-0120364      12/2007
KR     10-2009-0014192       2/2009
(Continued)

OTHER PUBLICATIONS

International Search Report Form PCT/ISA/220, International Application No. PCT/US2013/051513, pp. 1-11, Dated Oct. 29, 2013.

*Primary Examiner* — Henry Tsai
*Assistant Examiner* — Aurangzeb Hassan
(74) *Attorney, Agent, or Firm* — Bond Schoeneck & King, PLLC; George McGuire; Jonathan Gray

(57) ABSTRACT

The present invention relates to a cable (physical) tethering of a two computer related devices that are not specifically designed to communicate with each other, and, more particularly, to a man-portable and ruggedized physical tether device with hardware and software components for physical tethering and effectuation of data exchange (and subsequent processing of the exchanged data) between, e.g., a data visualization/mobile device and a network data collection device/equipment, without the need to retrofit/redesign any aspect of the visualization/mobile device or the a network collection device/equipment to accomplish the data exchange and subsequent processing of the exchanged data.

16 Claims, 9 Drawing Sheets

(51) Int. Cl.
*G06F 13/40* (2006.01)
*H04L 29/06* (2006.01)
*H04L 29/08* (2006.01)

(56) References Cited

U.S. PATENT DOCUMENTS

| | | | |
|---|---|---|---|
| 2007/0130599 A1* | 6/2007 | Monroe | 725/105 |
| 2009/0063717 A1* | 3/2009 | Bohm et al. | 710/8 |
| 2011/0047230 A1* | 2/2011 | McGee | 709/206 |
| 2012/0079594 A1 | 3/2012 | Jeong et al. | |
| 2012/0264375 A1* | 10/2012 | Shankaranarayanan | 455/41.2 |

FOREIGN PATENT DOCUMENTS

| | | |
|---|---|---|
| KR | 10-2011-0027797 | 3/2011 |
| KR | 10-2012-0059168 | 6/2012 |

\* cited by examiner

40

COMMUNICATIONS INTERFACE BETWEEN TWO NON-COMPLIMENTARY COMMUNICATION DEVICES

RELATED APPLICATION DATA

The present application claims the benefit of U.S. provisional patent application No. 61/673,945, filed Jul. 20, 2012, and is hereby incorporated by reference in its entirety.

BACKGROUND OF THE INVENTION

1. Field of the Invention

The present invention relates to a cable (physical) tethering of a two computer related devices that are not specifically designed to communicate with each other, and, more particularly, to a man-portable and ruggedized physical tether device with hardware and software components for physical tethering and effectuation of data exchange (and subsequent processing of the exchanged data) between, e.g., a data visualization/mobile device and a network data collection device/equipment, without the need to retrofit/redesign any aspect of the visualization/mobile device or the a network collection device/equipment to accomplish the data exchange and subsequent processing of the exchanged data.

2. Description of the Related Art

Physical tethering may be defined as the process of connecting, through a cable, two electronic devices. The term gets its name from how certain man-portable visualization devices (e.g., smart phone or tablet) are cable attached to a computer. Tethering can also be accomplished using a wireless connection of electronic devices, or a hybrid of methods.

Physical tethering is useful for transferring data to and from a computer device that cannot normally obtain that data through other communication such as WiFi or 3G/4G/LTE networks. Physical tethering is useful for transferring data between nodes of existing networks, or between an existing network node and some other nearby non-networked computer, which are not designed to communicate with one another. Tethering provides a cost effective linkage through which to share information without the huge costs associated with network redesign. There are numerous cross-network and out-of-network communication scenarios that can benefit from a physical tethering capability.

For example, military network communication provides ground troops with data that enhances situational awareness and participation in battlefield decisions. While the necessary digital video and geo-positioning data that the troops need is resident in several of the close proximity military radio networks, their ability to effectively and safely extract, display and interact through mobile smart devices has not been designed into the network.

Description of the Related Art Section Disclaimer: To the extent that specific patents/publications/products are discussed above in this Description of the Related Art Section or elsewhere in this application, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Description of the Related Art Section and/or throughout the application, the descriptions/disclosures of which are all hereby incorporated by reference into this document in their respective entirety(ies).

SUMMARY OF THE INVENTION

The present invention recognizes that the advent and proliferation of small, man-portable data visualization devices (i.e., smart phones or tablets) can be solutions that provide a means for ground troops to interact; serial data tethering between network collection equipment (i.e., military radios) and man portable data visualization devices can provide the means by which data is appropriately extracted from a network. However, the present invention also recognizes that there are potential problems and/or disadvantages with conventional wireless tethering techniques. For example, previous attempts to provide tethering as a solution for the ground troop situational awareness scenario described above have concentrated on the use of wireless tethering techniques using 3G, 4G, LTE or WiFi networks. This has resulted in development cost and implementation issues, data security concerns, and data loss as a result of connectivity continuity issues. Various embodiments of the present invention may be advantageous in that they may solve or reduce one or more of the potential problems and/or disadvantages discussed above.

Various embodiments of the present invention may exhibit one or more of the following objects, features and/or advantages:

It is therefore a principal object and advantage of the present invention to provide a communication interface between two non-complimentary communication devices, e.g., network data collection equipment (i.e., military radios) and man portable data visualization devices (i.e., smart phones or tablets) through the use of a rugged man-portable physical tethering device that can include customized structural, hardware and software components.

It is another object and advantage of the present invention to provide a communication interface between two non-complimentary communication devices that addresses the need for varied data interconnections among collection equipment types through the use of specialized adapter cables/connectors that readily mate the communication interface to collection equipment of interest.

It is a further object and advantage of the present invention to provide a communication interface between two non-complimentary communication devices that provides a mechanism to automatically, with little or no configuration, allow data visualization devices, that use commercial wireless standards, to be physically wired/tethered to data collection equipment without the need for retrofitting/redesign or for a personal computer or laptop for data routing.

In accordance with the foregoing objects and advantages, embodiments of the present invention comprise systems, program code, and methods for physically tethering two non-complimentary communication devices comprising a first communication device and a second communication device. According to one embodiment, a physical tether device is provided and can include: a communication interface for communication with the first communication device over a first cable and with the second communication device over a second cable, the communication interface configured to receive data from the first communication device; a processor connected to the communication interface, the processor programmed and configured to: receive the data from the first communication device through the communication interface; process the data received from the first communication device for routing to and for displaying on the second communication device; and rout the data received from the first communication device to the second communication device through the communication interface.

In accordance with another embodiment of the present invention, a non-transitory computer-readable storage medium containing program code and can include: program code for receiving data from a first communication device through a communication interface; program code for processing the data received from the first communication device for routing to and for displaying on the second communication device, wherein the first communication device and the second communication devices are non-complimentary communication devices; and program code for routing the data received from the first communication device to the second communication device through the communication interface.

In accordance with a further embodiment a method is provided that can include the steps of receiving, by a processor, data from the first communication device through a communication interface; processing, by the processor, the data received from the first communication device for routing to and for displaying on the second communication device; and routing, by the processor, the data received from the first communication device to the second communication device through the communication interface.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
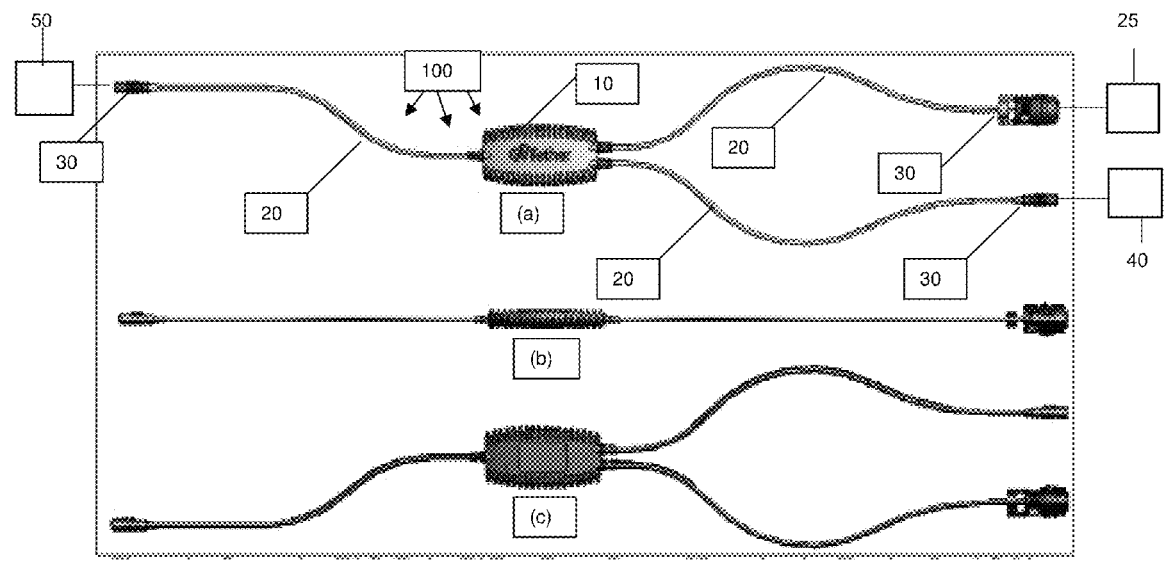
FIG. 1a-c is a schematic representation of a top view, a front view, and a bottom view, respectively, of a physical tether device, according to an embodiment of the present invention.

The present invention will be more fully understood and appreciated by reading the following Detailed Description in conjunction with the accompanying drawings, wherein like reference numerals refer to like components.

The communication interface (or physical tether device) of an embodiment of the present invention can include both hardware and software components/aspects. The physical tether device is structured, programmed, and/or located to include the software and hardware to enable communication to occur seamlessly between two non-complimentary communication devices (i.e., device agnostic). For example, the physical tether device can support real-time two-way routing of varied data including textual data (i.e., Cursor-on-Target messages) and streaming of geospatial data (i.e., raster imagery or video) from the data collection equipment (i.e., military radios) to the data visualization device (i.e., smart phone or tablet) through a physical connection (and preferably not 3G/4G/LTE or WiFi based). The device can include a ruggedized housing (FIG. 1, reference numeral 10) that includes an internal computer (FIG. 2, reference numeral 7), with a data visualization device cable/connector (FIG. 1, reference numerals 20/30), a collection equipment cable/connector (FIG. 1, reference numerals 20/30), and a power input/cable connector (FIG. 1, reference numerals 20/30). The internal computer can run a Linux operating system (or other similar operating system, as should be understood by those skilled in the art) and custom developed tethering software, as described further below. When in use, the data collection equipment and the data visualization devices can be connected and exchange data through the physical tether device.

Table 1 below provides an overview of example tactical military radios and smart visualization devices (as should be understood by those of skill in the art) that the physical tether device of an embodiment of the present invention can operate current interoperates. Table 2 describes the level of functionality expected while using the physical tether device.

TABLE 1

Overview of the Tactical Military Radios and Smart Visualization Devices

| Android ™ type Devices (not exhaustive): | Military Radios (not exhaustive): |
|---|---|
| Dell Streak 5" | Harris 152C - SA Tracks Only |
| HTC Thunderbolt ADR6400L | Harris 117G - IP capable |
| Samsung Devices: | Persistent Systems WaveRelay |
| Galaxy SII GT-I9100, GT-I9100G | MPU4 - IP capable |
| Galaxy SIII GT I9300 | L3 Tactical ROVER (SIR) |
| Galaxy Note GT-N7000, SGH-I717 | Trellisware AVAS |
| Galaxy Note II GT-N7100, GT-N7105 | Harris 152A, IP capable |
| Galaxy Tab 7.0 Plus GT-P6201, GT-P6210 | |

TABLE 2

| Operating System | Functionality | | | |
|---|---|---|---|---|
| | Fully Internet Capable | Proxy Network Capable | Auto Tether | Semi Auto Tether |
| Jelly Bean 4.1 | | X | | X |
| Ice Cream Sandwich 4.0 | | X | | X |
| Honeycomb 3.0 | | X | X | |
| Gingerbread 2.3 | | X | X | |
| Jelly Bean 4.1 - Rooted | X | | | X |
| Ice Cream Sandwich 4.0 - Rooted | X | | | X |
| Honeycomb 3.0 - Rooted | X | | X | |
| Gingerbread 2.3 - Rooted | X | | X | |

The hardware components of the physical tether device can be divided into structural and electronic components. As noted above, in accordance with an embodiment of the present invention, a light, man-portable and ruggedized data physical tether device for use between data collection equipment and data visualization devices, for example, is provided. A general overview of the structural/hardware components of the physical tether device 100 will now be described with reference to FIGS. 1-2.

As shown in FIG. 1a-c, a schematic representation of a top view, a front view, and a bottom view, respectively, of the physical tether device 100 is illustrated, in accordance with an embodiment of the present invention. The housing 10, lead cables 20, and connectors 30 to a data visualization device 50, a power supply 25, and a data collection device 40 are shown. The physical tether devices can be used in temperatures ranging between −25 C and +55 C and its resistance to environmental ingress can meet IEC 60529 with compliance to IP66.

Figure 2:
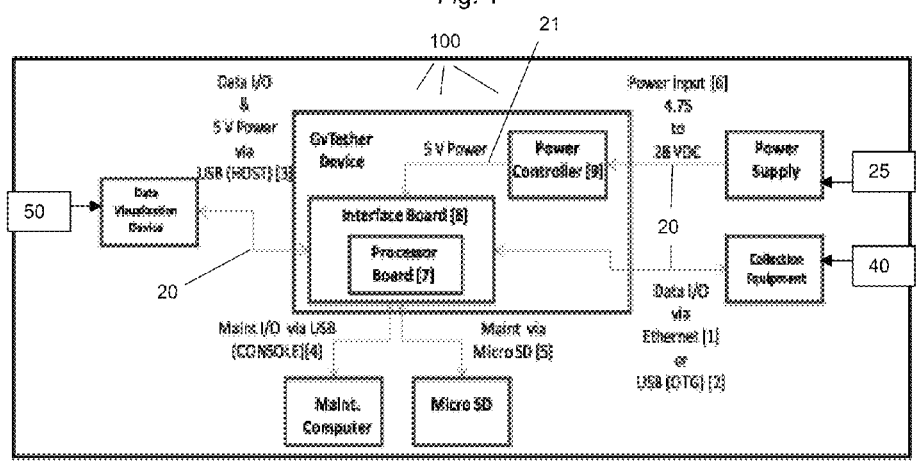
FIG. 2 is a high level interface block diagram of a physical tether device, according to an embodiment of the present invention.

The physical tether device 100 of an embodiment of the present invention can have several interfaces. FIG. 2 is a high level interface block diagram of the physical tether device, according to an embodiment of the present invention. The physical tether device's 100 electrical data interfaces can include Ethernet 1 and universal serial bus (USB) on-the-go (OTG) 2, which can be typically used as inputs to the physical tether device 100 from collection equipment (e.g., radio data devices) 40, and USB (Host) 3, which can be typically used as an output from the physical tether device 100 to a data visualization device (e.g., smart phone-based computer device) 50, for example. The physical tether device 100 can also have USB (Console) 4 and Micro Secure Digital (SD) 5 support interfaces, typically used for setup and maintenance I/O. The physical tether device's 100 power input interface 6 allows for an input voltage ranging anywhere between 3 and 28 Voltage Direct Current (VDC). Also, FIG. 2 shows a power supply 25, an interface board 8, a processor board 7, and a power controller 9. As shown, the processor board 7 can be coupled to the interface board 8 and can contain some or all of the software components of the physical tether device 100 in memory, which is discussed further below. The interface board 8 can interface with the devices outside of the housing 10 of the physical tether device 100 (and, in turn, the processor board can interface with these devices) including (1) the power supply 25 through the power controller 9 through connection 21, the (2) collection equipment 40 though the cable 20, and the data visualization device through cable 20.

As noted above, the invention consists of both hardware and software components/aspects, which are described in further detail below.

Hardware

The electronic hardware components can be further divided into active and passive electronic components. The active electronic components of the physical tether device can include a processor board 7, an interface board 8, and a power controller board 9, as shown in FIG. 2.

An example of the processor board 7 can be a GumStix IronStorm Board. An example of the interface expansion board 8 can be a Tobi Expansion Board upon which the processor board 7 sits. An example of a DC-to-DC input power controller board 9 can be a DC-to-DC Converter Board. The processor 7 and interface expansion boards 8 can be modified prior to physical tether device 100 assembly by removing certain components including interface connector hardware that is not used since interfaces can be electrically remotely relocated on the physical tether device 100. This can provide access to board electrical attachment points and room for wire routing in the physical tether device 100. The processor board 7 can have, for example, an 800 MHz ARM® Cortex™-A8 Core, 512 MB RAM, 512 MB NAND Flash, and a Linux Version 3.x Operating System.

The passive electronic components of the physical tether device can include more than one (e.g., three) I/O lead cables/connectors, their generic terminating connectors, and cable wiring which interfaces the lead cables to appropriate locations on the active electronic components.

Figure 3:
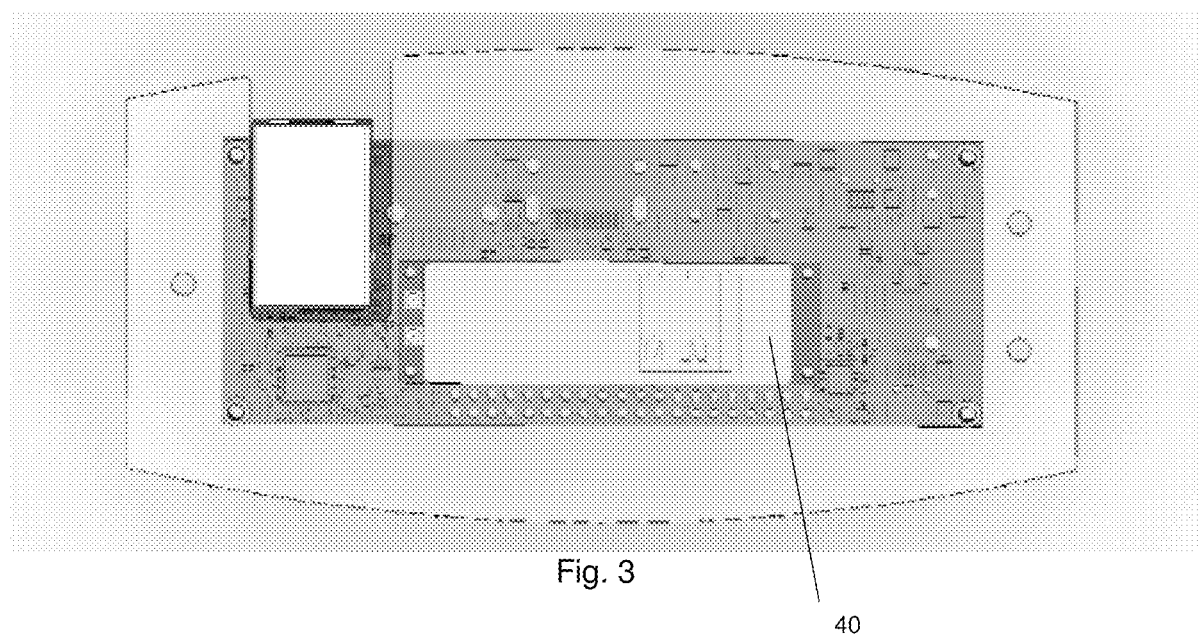
FIG. 3 is a schematic representation of a heat sink plate portion of the physical tether device, according to an embodiment of the present invention.
Figure 4:
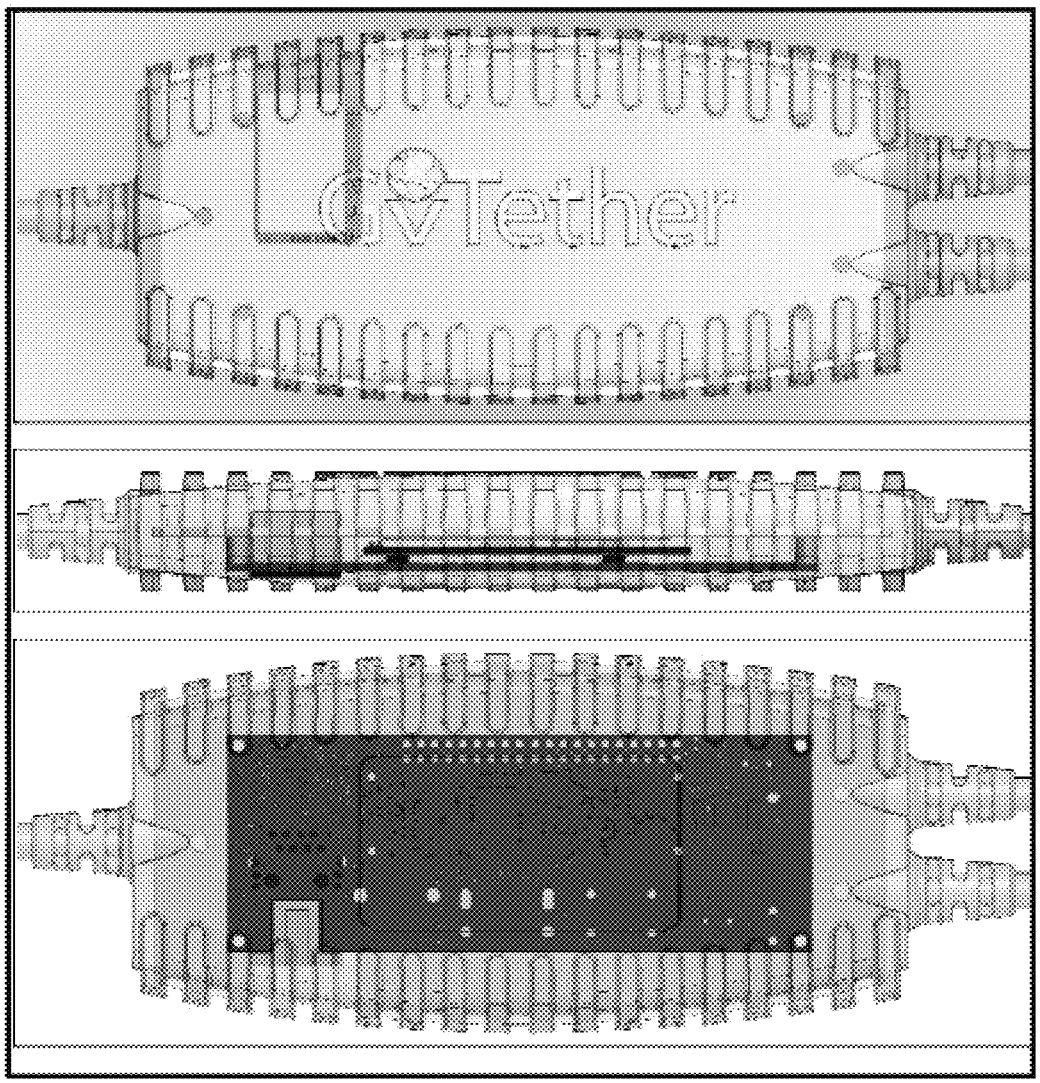
FIG. 4 is a schematic representation of a transparent top view, a front view, and a bottom view, respectively, of a housing portion of the physical tether device, according to an embodiment of the present invention.

Other structural components of the physical tether device can include a metal heat sink plate 40 (see, e.g., FIG. 3, showing a Heat Sink Plate Mounted Against Processor Board), which can be mounted against the processor board 7 and expansion board electronics, to draw away heat and provide structural rigidity, and a ruggedized housing 10 in the form of a shaped and sealed thermoplastic over-mold (see FIG. 1 (showing a showing a Ruggedized Housing Showing Grip) and FIG. 4 (showing a Heat Sink and Electronics Positioning Detail Through Transparent Housing)), which encloses the active electronic components and the attached internal cable wiring, and partially encloses the heat sink plate. The over-mold housing 10 can be shaped with ridges on the outer edges to provide a non-slip hand grip for the device. The outer edges of the heat sink plate can be exposed between the over-mold ridges to provide for greater heat dissipation within the device.

Additional hardware details can include the following. The lead cables/connectors 20/30 of the physical tether device can be integral with, and protrude from, the ruggedized housing (see, e.g., FIG. 4). One can be on one side, terminating with a data I/O connector for the visualization device interface 50. Two can be on the opposite side, one terminating with a unique generic power input connector and one terminating with a data I/O connector for the data collection equipment 40 communication interface (these two cables/connectors can be combined into one cable/connector, as shown and described with respect to the alternate physical tether device below). When in use, the I/O connectors can be attached to I/O equipment through the use of specialized adapter cables that can be offered with the physical tether device. The specialized adapters may be needed, as either the data visualization device 50, power supply 25, or the data collection equipment 40 may have a unique connector interface that the cable needs to attach to.

Figure 5:
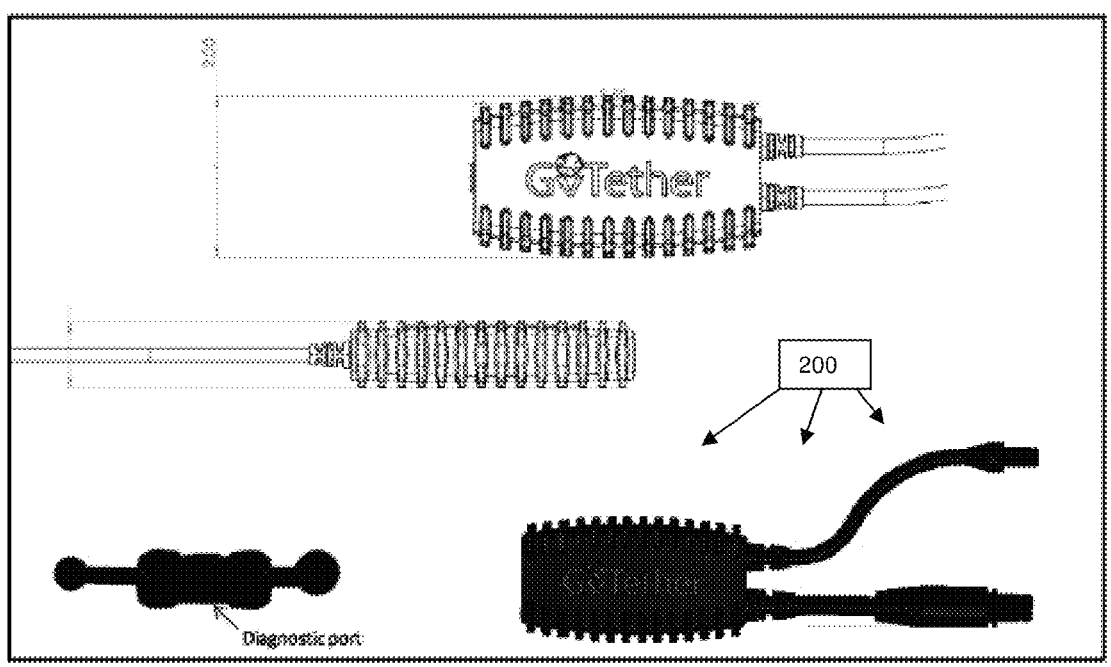
FIG. 5a-d is a schematic representation of a various views of a physical tether device, according to an alternative embodiment of the present invention.

In accordance with an alternative embodiment, shown in FIG. 5 is a physical tether device 200 that is smaller, about half the size and weight as the previously described than the previously described physical tether device 100 (i.e., 3.5"× 2"×0.82"), and reduces the form factor and cable complexity that may be found in other embodiments previously described. Other aspects of this alternative embodiment include: integrated power management (3-28 VDC input for wide power input; ~3.75 W running GV Tether while charging the handheld visualization device), rapid customization and reduced construction complexity; and connectors (removal of connector stubs leading to Direct connection to data collection equipment auxiliary connector for power and Ethernet, Direct connection to handheld visualization device, and Diagnostic power (SD Micro and USB Console) embedded into physical tether device Case. This set-up allows for the powering of the physical tether device 200 and the visualization device through the data collection equipment.

Software

The software component of the physical tether device can support data adaptation for both the data collection equipment and the data visualization devices, as described above. The software component is structure, programmed, and/or located to allow for real-time two-way routing of varied data such as geospatial data (i.e., Cursor-on-Target messages), as well as streaming of geospatial data (i.e., video, raster imagery) from existing radio data equipment to data visualization devices without the use of wireless tethering methods, and via any of several more secure, physical interface types. The software component sets up the routing so that the communication between the two devices to happen seamlessly at the date level (there is no need to alter the software kernel of either device for communication of the data to occur). The physical tether device allows the data visualization devices 50 and the data collection equipment 40 to communicate through a service capable of routing geospatial based data messages, for example. The "service" can include service modules as discussed further below with respect to FIG. 10. As should be understood and appreciated by those of skill in the art, a module can include, among other things, the identification of specific functionality represented by specific computer software code of a software program. A software program may contain code representing one or more modules, and the code representing a particular module can be represented by consecutive or non-consecutive lines of code. The data visualization device can set up a tether through the USB host on the computing device (i.e., the processor board 7), which then contacts to the service on the computing device 7, which then sets up a TCP/IP connection, for example.

When the processor board 7 is processing data such as geospatial data, a message can be created on the data visualization device and set in a packet containing both the message and the UDP destination endpoint specified in unicast or multicast IP notation. The message is then received by the service and copied to the Ethernet implementation on the computing device hooked up to the network. The message is retransmitted using the UDP destination specified. Finally, a message is received over multicast or unicast from a network and copied to the TCP/IP connection that has been set up between the data visualization device and the computing device.

When the processor board 7 is processing data such as a video, a request is made for video data from a specified location specified as unicast, multicast, or HTTP notation. The service takes the request and in the case of Unicast/Multicast video data already in MPEG-2 with or without key length value (KLV) copies the data from the unicast or multicast location to a specified unicast address that the data visualization device's video application will use. When processing Unicast/Multicast video data not in MPEG-2 with or without KLV and all HTTP, the data is transcoded by the computing device and sent to a specified unicast address that the data visualization device's video application will use.

The physical tether device (100, 200) of an embodiment of the present invention can have a variety of connection points to accomplish the interconnection between a collection device and a visualization device. That is, the physical tether device (100, 200) is structured, programmed, and or located to handle multiple USB devices, Ethernet over USB, and/or Ethernet devices, for example.

Figure 6:
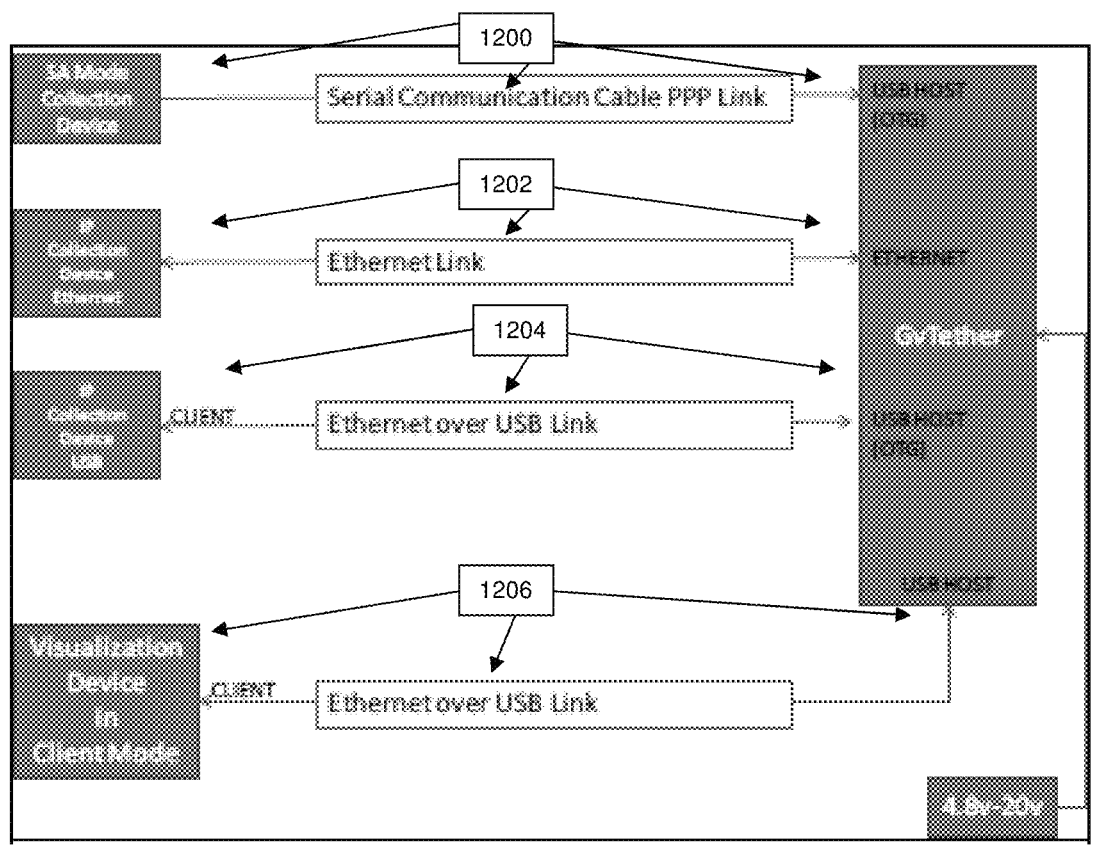
FIG. 6 is a flow/sequence diagram that defines example non-limiting types of data collection equipment and connection points to the physical tether device, and a visualization device and its connection point to the physical tether, according to an embodiment of the present invention.

Turning to FIG. 6, example non-limiting types of data collection equipment and connection points to the physical tether device 100/200 (e.g., SA mode collection device with a serial communication cable PPP link 1200; IP collection device with an Ethernet link 1202; IP collection device with an Ethernet over USB link 1204), and a data visualization device 50 (which can be in client mode, where the physical tether device 100/200 can send power to the data visualization device 50—power can be drawn from the data collection device 40 or the power supply 25 through the physical tether device 100/200 to the data visualization device 50) and its connection point to the physical tether device 100/200 (Ethernet USB link 1206) are defined. Stated differently, FIG. 6 shows different communication protocols, which are made available by both a hardware component and a software component connection (typically, first a hardware connection is made and the software connection is made, and the functionality implemented by the software component can be initiated).

Figure 7:
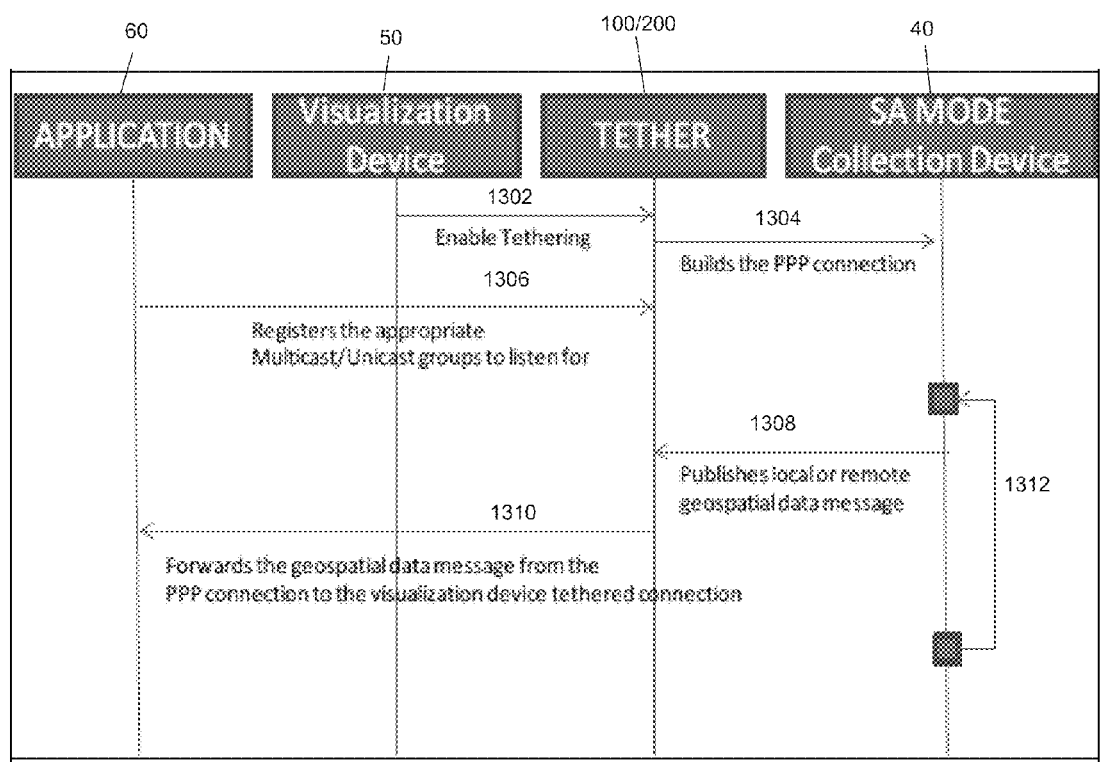
FIG. 7 is a flow/sequence diagram showing the creation of a point-to-point protocol (PPP) link between the physical tether device and the data collection equipment, according to an embodiment of the present invention.
Figure 8:
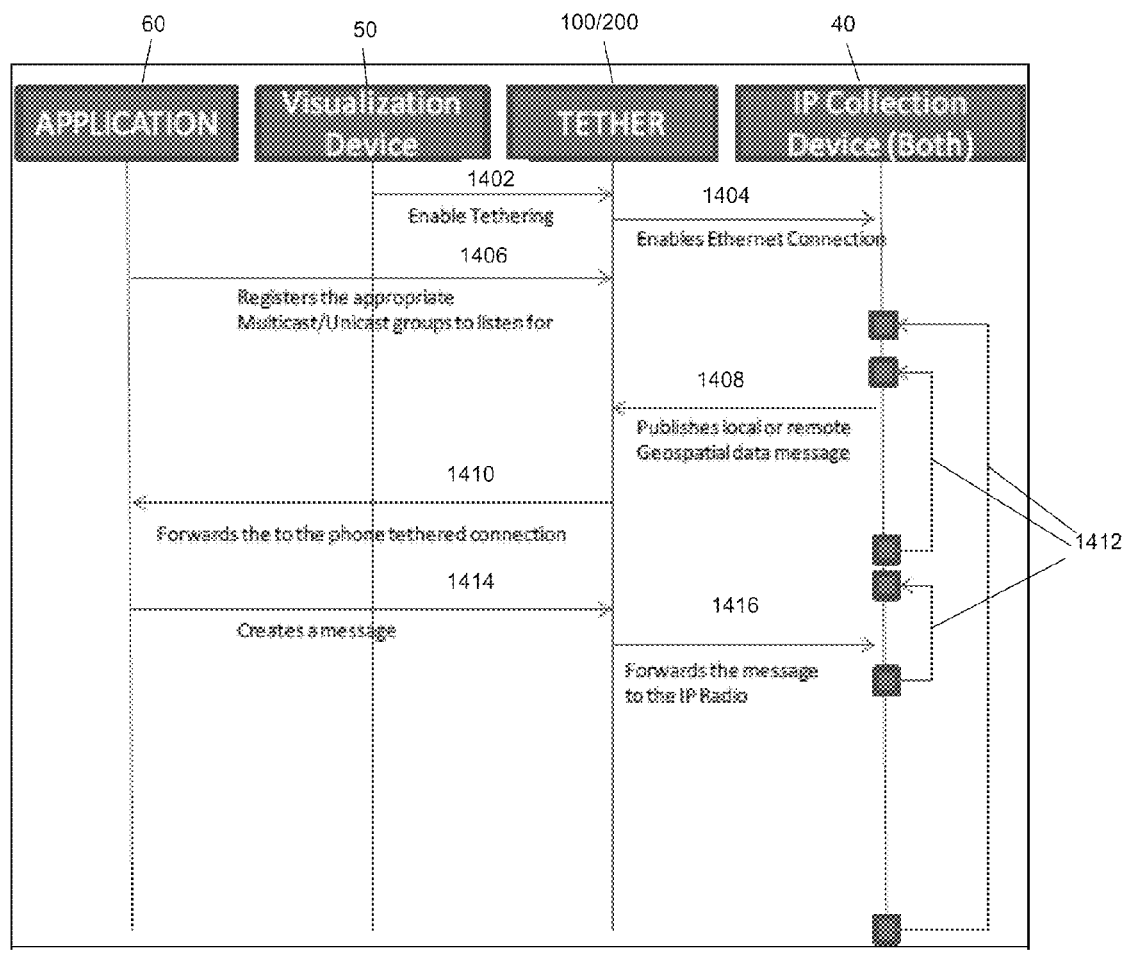
FIG. 8 is a flow/sequence diagram showing IP radio mode, according to an embodiment of the present invention.
Figure 9:
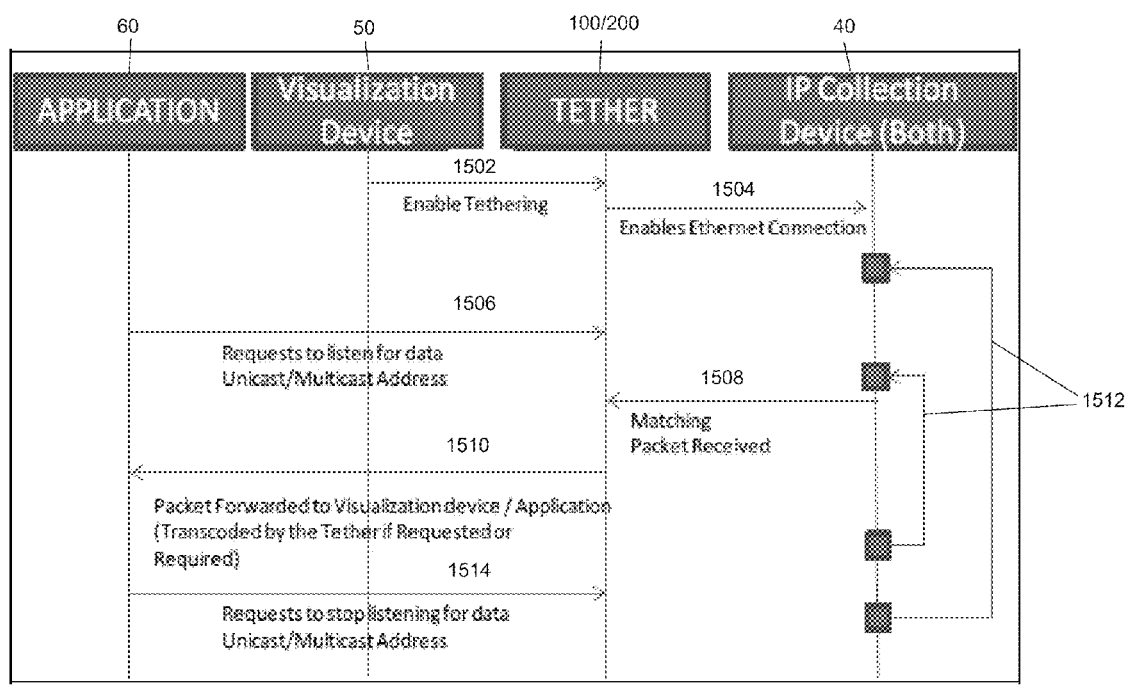
FIG. 9 is a flow/sequence diagram showing the methodology for processing incoming and outgoing video, according to an embodiment of the present invention.

FIGS. 7-9 are flow/sequence diagrams that show the flow of data from a collection device 40 to a visualization device 50 (and back out to the collection device in the case of FIGS. 8 and 9), with an application 60 stored thereon, through a physical tether device 100/200 which includes a software component that is structured, located, and/or programmed to enable this communication of data (e.g., video, text, and/or geospatial data) between the devices 50 and 60. The architecture of the software component is described in further detail with respect to FIG. 10.

FIG. 7 is a flow/sequence diagram showing the creation of a point-to-point protocol (PPP) link between the physical tether device 100/200 and the data collection equipment 40 in a series of steps 1302-1312 (no particular order is necessarily required). The physical tether device 100/200 is also shown connected to the visualization device 50 that has an application 60 stored and executable thereon. This connection enables tethering at step 1302. In a situational awareness (SA) mode of operation and tethered to a radio 40, for example, over a serial USB connection, the physical tether device 100/200 can build/create a PPP link at step 1304 between the physical tether device 100/200 and the data collection equipment 40. The application 60 running on the data visualization device 50 can be responsible for (structured, programmed, and/or configured to) setting up which addresses and ports to listen on for SA traffic in geospatial data format, for example. The application 60 is structured, programmed, and/or configured to enable the visualization device 50 to register the appropriate multicast/unicast groups to listen for at step 1306. The collection device 40 can publish local or remote geospatial data at step 1308, for example, to the physical tether device 100/200. The physical tether device 100/200 can be responsible for passing the received traffic from the PPP link to the data visualization device link at step 1310. The forwarded data can then be viewed on the visualization device through the use of the application 60. The visualization device can pass an acknowledgement at step 1312 that it received the data through the physical tether device 100/200 to the collection device 40.

FIG. 8 is a flow/sequence diagram showing IP radio mode, according to an embodiment of the present invention. This flow/sequence diagram is similar to the flow/sequence diagram shown in FIG. 7; however, FIG. 7 only shows the receipt of data by the visualization device 50 from the collection device 40 through the physical tether device 100/200. FIG. 8 shows connections and passage of data to and from (bidirectional) the data collection equipment 40 and the visualization device 50 in a series of steps 1402-1416 (no particular order is necessarily required) with an application 60 stored and executable on the visualization device. In FIG. 8, step 1402 shows a connection between the devices that enables tethering as a function of and through the physical tether device 100/200. Step 1404 shows the physical tether device 100/200 can build/create/enable an Ethernet connection (instead of a PPP link, as shown in FIG. 7, because of the type of radio "IP collection device" that allows the bidirectional flow of data as this type of radio can publish data received from the tethered visualization device 50) between the physical tether device 100/200 and the data collection equipment 40. Step 1406 shows that the application 60 is structured, programmed, and/or configured to enable the visualization device 50 to register the appropriate multicast/unicast groups to listen for. In step 1408, the collection device 40 can publish local or remote geospatial data message 1408 received from another data collection device (not shown), for example, to the physical tether device 100/200. In step 1410, the physical tether device 100/200 is structured, located, and/or programmed to forward to the visualization device 50 the data message from the collection device 40. Additionally, the application 60 on the visualization device 50 can create a message with data at step 1414 that can pass to the collection device for broadcast/publishing purposes at step 1416 through the physical tether device 100/200. Stated differently, in an internet protocol (IP) collection device mode, as shown in FIG. 8, the physical tether device 100/200 does not need to set up any additional links and can pass all geospatial data, for example, between the Ethernet link (both) and the data visualization device link bi-directionally. The application 60 on the data visualization device 50 can be responsible for registering what ports and addresses to listen to for geospatial data traffic. Acknowledgements are shown at 1412.

FIG. 9 is a flow/sequence diagram showing the methodology for processing incoming and outgoing video, according to an embodiment of the present invention. This flow/sequence diagram is similar to the flow/sequence diagram shown in FIG. 8. FIG. 9 shows connections and passage of data to and from (bidirectional) the data collection equipment 40 and the visualization device 50 in a series of steps 1502-1514 (no particular order is necessarily required) with an application 60 stored and executable on the visualization device. Step 1502 shows a connection between the devices that enables tethering as a function of and through the physical tether device 100/200. Step 1504 shows the physical tether device 100/200 can build/create/enable an Ethernet connection (instead of a PPP link, as shown in FIG. 7) between the physical tether device 100/200 and the data collection equipment 40. Step 1506 shows that the application 60 is structured, programmed, and/or configured to enable the visualization device 50 to register the appropriate multicast/unicast groups to listen for. In step 1508, the collection device 40 can publish matching data packets that are received, for example, to the physical tether device 100/200. In step 1510, the physical tether device 100/200 is structured, located, and/or programmed to forward to the visualization device 50 the data packet from the collection device 40, and physical tether device 100/200 is structured, located, and/or programmed to transcode the data packet if requested or required by the visualization device 50/application 60. Requests can be made to stop listening for data unicast/multicast address at step 1514. Acknowledgements are shown at 1512. Video on data collection equipment 40, for example, can be passed between the Ethernet link (both) and data visualization device 50 bi-directionally, per FIG. 9. The application 60 on the data visualization device 50 can be responsible for registering what ports and addresses to listen for video on. FIG. 9 presents the methodology for processing incoming and outgoing video, for example. For incoming video, the application 60 can also specify if transcoding is desired if it is not required. For outgoing data (visualization device 50 to the collection device 40), the physical tether device may not offer transcoding.

Figure 10:
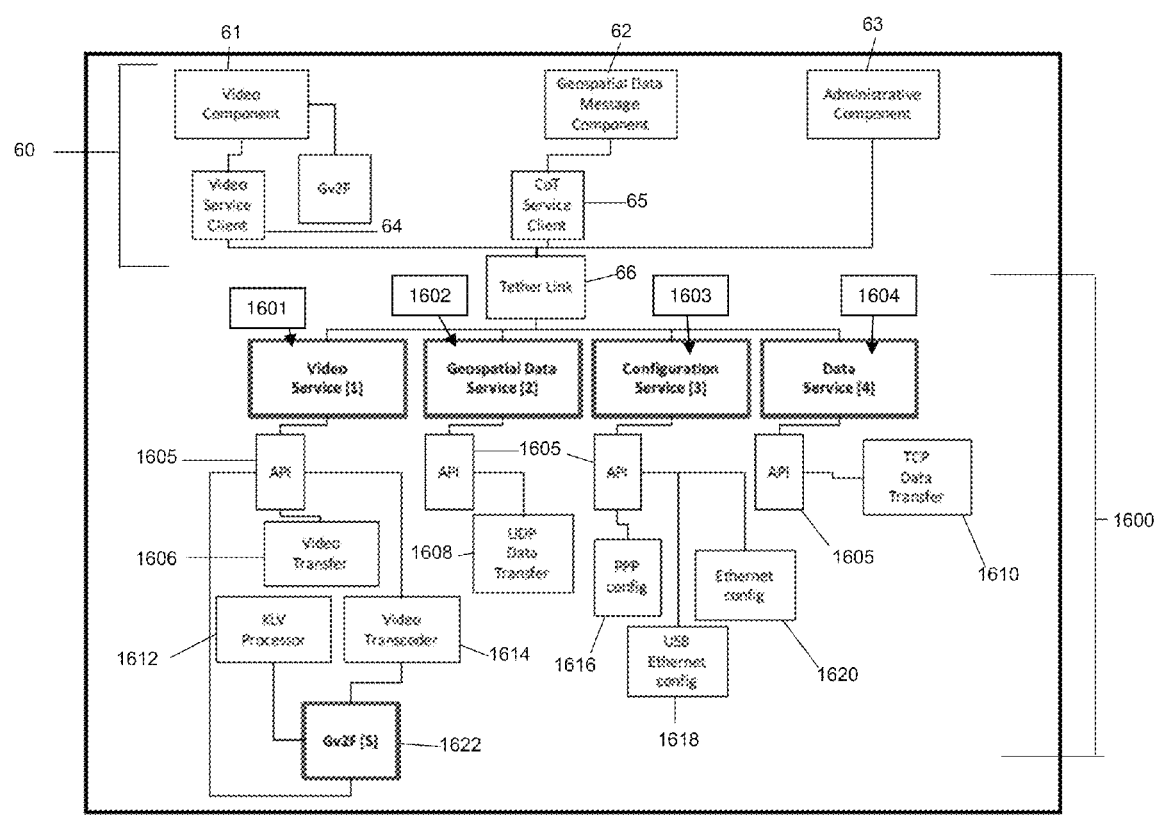
FIG. 10 is a software architecture block diagram related to the software component of the physical tether device, according to an embodiment of the present invention.

Turning to FIG. 10, a software architecture block diagram related to the software component of the physical tether device is shown. This software component can include several discrete software blocks/modules allowing for custom tailoring of capabilities in the field, and can be stored on the processor board 7, and processed by the processor board 7, as discussed further below. FIG. 10 shows further shows the components of the application 60 on the visualization device 50 and the interaction/connection between the application 60/visualization device 50 and the software component 1600 on the processor 7 of the physical tether device 100/200.

Application 60 can include plurality of data components/modules including a video component 61 and a geospatial data message component 62. These components are structured and/or programmed to enable the visualization device to present the video, text, and/or geospatial data on the visualization device 50 for viewing by a user of the visualization device 50. The video service client 64 and the cursor on target client 65 sets up a user interface (GUI) on the visualization device for the viewing of the video and other text and GPS related data. The administration component 63 allows the set up of certain parameters, including data transfer for example (as should be appreciated by those of skill in the art). The tether link 66 is the communication channel between the physical tether device 100/200 and the visualization device.

Software component 1600 can include a plurality of executable service components/modules including a video service module 1601, a geospatial data service module 1602, a configuration service module 1603, and a data service module 1604. These service modules are preferably the core components of the software component. These software components are fundamentally structured, programmed, and/or located to establish a connection between a data visualization device 50 and a data collection device 40 through the physical tether device 100/200. Stated differently, these service modules are structured, programmed, and/or located to allow for real-time two-way routing of varied data such as video, geospatial data (i.e., Cursor-on-Target messages), and/or streaming of geospatial data (i.e., video, raster imagery) (depending on the particular software module) from data collection equipment 40 to data visualization devices 50. For example, the video service module 1601 (was built using Gv2F 1622, which is a set of software libraries that supports the generation of an application that allows for the management of the video data which is needed when there is a large amount of metadata related to, for example, GPS data for each video frame) is capable of processing video streams from a variety of sources both in unicast and multicast. Geospatial data module 1602 allows for the data visualization device 50 to register to listen for cursor on target messages both in unicast and multicast.

Each service module can include at least one submodule. For example, video service module 1601 can include a video transfer module 1606 which is structured and/or programmed to set up a video stream, and/or collect or transfer video data from a data collection device 40. The video transcoder submodule 1614 is structured and/or programmed to assist with the previously discussed transcoding step. The KLV processor submodule 1612 is structured and/or programmed to allow a visualization device 50 user to view particular metadata (e.g., indicating where the video frame was collected from) in each frame, if any, of a video.

The geospatial data service module 1602 can include a UDP data transfer submodule 1608. This submodule is structured and/or programmed to set up the message format structure of a geospatial message (i.e., a format field) received from a data collection device 40.

The data service module 1604 can include a TCP data transfer module 1610, which is structured and/or programmed to assist with TCP data transfer.

The configuration service module 1603 is structured and/or programmed to set up the particular configuration that is needed including data rates, protocol, interfaces etc. The configuration service module 1603 can include several submodules including a PPP configuration module 1616, a USB/Ethernet configuration module 1618, and an Ethernet configuration module 1620. These submodules are structured and/or programmed to set up exactly what the data rates, protocol, interfaces etc. as would be appreciated by those of skill in the art per the names of each submodule.

Each of the service modules includes an application program interface (API). As should be appreciated by those skilled in the art, the APIs are structured and/or programmed to be a set of descriptions regarding how to invoke the functionalities of each service module.

The Configuration Service module 1603 allows for infield set up of the physical tether device for a mode of operation. This allows the user to select the device to interoperate with a variety of data collection equipment and data visualization devices. Data Proxy module 1604 allows for future enhancement and supports direct data routing for protocols such as HTTP.

As will be appreciated by one skilled in the art, aspects of the present invention may be embodied/implemented as a computer system, method or computer program product. The computer program product can have a computer processor, for example, that carries out the instructions of a computer program. Accordingly, aspects of the present invention may take the form of an entirely hardware embodiment, an entirely software embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction performance system, apparatus, or device.

The program code may perform entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Although the present invention has been described in connection with a preferred embodiment, it should be understood that modifications, alterations, and additions can be made to the invention without departing from the scope of the invention as defined by the claims.

What is claimed is:

1. A physical tether device for physically tethering at least two non-complimentary communication devices comprising a first communication device and a second communication device, said physical tether device comprising:
 a communication interface for communication with at least said first communication device over a first cable and with a second communication device over a second cable and a third communication device over a third cable, the communication interface comprising a plurality of different data links comprising a point-to-point protocol link, an Ethernet link, and an Ethernet over universal serial bus link, the communication interface configured to receive data from at least said first communication device and to communicate with a plurality of communication devices, including the second communication device and the third communication device, over the plurality of different data links at the same time;
 a processor connected to said communication interface, said processor programmed and configured to:
  receive said data from said first communication device through said communication interface, wherein said first communication device is a data collection device comprising a military radio;
  process said data received from said first communication device for routing to and for displaying on said second communication device; and
  route said data received from said first communication device to said second communication device and to said third communication device through said communication interface simultaneously.

2. The physical tether device of claim 1, wherein said communication interface is further configured to receive data from said second communication device.

3. The physical tether device of claim 2, wherein said processor is further programmed and configured to:

receive data from said second communication device through said communication interface;

process said data received from said second communication device for routing to said first communication device; and route said data received from said second communication device to said first communication device through said communication interface.

4. The physical tether device of claim 1, wherein said communication interface further comprises a plurality of data interfaces.

5. The physical tether device of claim 4, wherein said plurality of data interfaces are selected from the group consisting of an Ethernet interface and universal serial bus interface.

6. The physical tether device of claim 1, wherein said military radio is selected from the group consisting of a situational awareness collection device and an IP collection device.

7. The physical tether device of claim 1, wherein said processor is further programmed and configured to transcode said data received from said first communication device if required for displaying said data on said second communication device.

8. The physical tether device of claim 1, wherein said second communication device is a data visualization device.

9. The physical tether device of claim 8, wherein said data visualization device is a device selected from the group consisting of a smart phone and a tablet.

10. The physical tether device of claim 1, wherein said data further comprises data selected from the group consisting of video data, text data, and geospatial data.

11. A non-transitory computer-readable storage medium containing program code comprising:

program code for receiving data from a first communication device through a communication interface, said communication interface comprises a plurality of different data links comprising a point-to-point protocol link, an Ethernet link, and an Ethernet over universal serial bus link, is configured to receive data from at least said first communication device and to communicate with a plurality of communication devices over the plurality of different data links at the same time;

program code for processing said data received from said first communication device for routing to and for displaying on said second communication device and third communication device of the plurality of communication devices, wherein said first communication device, said second communication device, and said third communication device are non-complimentary communication devices, wherein said first communication device is a data collection device comprising a military radio; and program code for routing said data received from said first communication device to said second communication device and said third communication device through said communication interface simultaneously.

12. The non-transitory computer-readable storage medium of claim 11, further comprising program code for:

receiving data from said second communication device through said communication interface;

processing said data received from said second communication device for routing to said first communication device; and routing said data received from said second communication device to said first communication device through said communication interface.

13. The non-transitory computer-readable storage medium of claim 11, further comprising program code for transcoding said data received from said first communication device if required for displaying said data on said second communication device.

14. A computer implemented method for physically tethering two non-complimentary communication devices comprising a first communication device and a second communication device, the method comprising the steps of:

receiving, by a processor, data from said first communication device through a communication interface, said communication interface comprises a plurality of different data links comprising a point-to-point protocol link, an Ethernet link, and an Ethernet over universal serial bus link, is configured to receive data from at least said first communication device and to communicate with a plurality of communication devices over the plurality of different data links at the same time, wherein said first communication device is a data collection device comprising a military radio;

processing, by said processor, said data received from said first communication device for routing to and for displaying on said second communication device and on a third communication device of the plurality of communication devices; and routing, by said processor, said data received from said first communication device to said second communication device and said third communication device through said communication interface simultaneously.

15. The method of claim 14, further comprising the steps of:

receiving, by said processor, data from said second communication device through said communication interface;

processing, by said processor, said data received from said second communication device for routing to said first communication device; and routing, by said processor, said data received from said second communication device to said first communication device through said communication interface.

16. The method of claim 15, further comprising the step of transcoding, by said processor, said data received from said first communication device if required for displaying said data on said second communication device.

* * * * *